J. H. RESSLER.
CULINARY VESSEL.
APPLICATION FILED OCT. 18, 1907.
921,888.
Patented May 18, 1909.
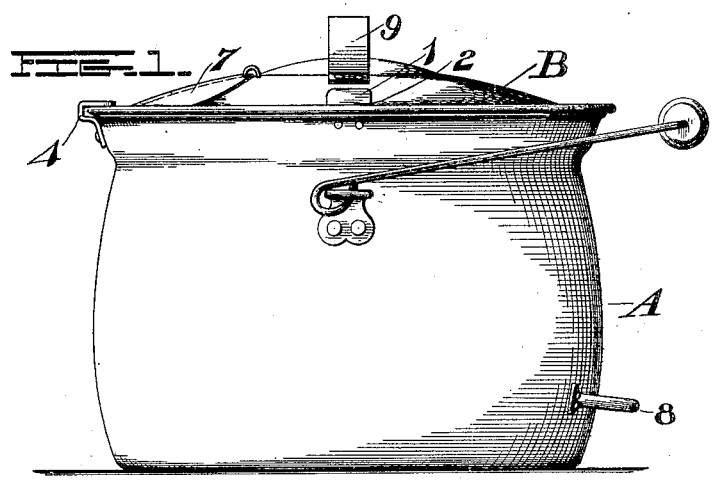
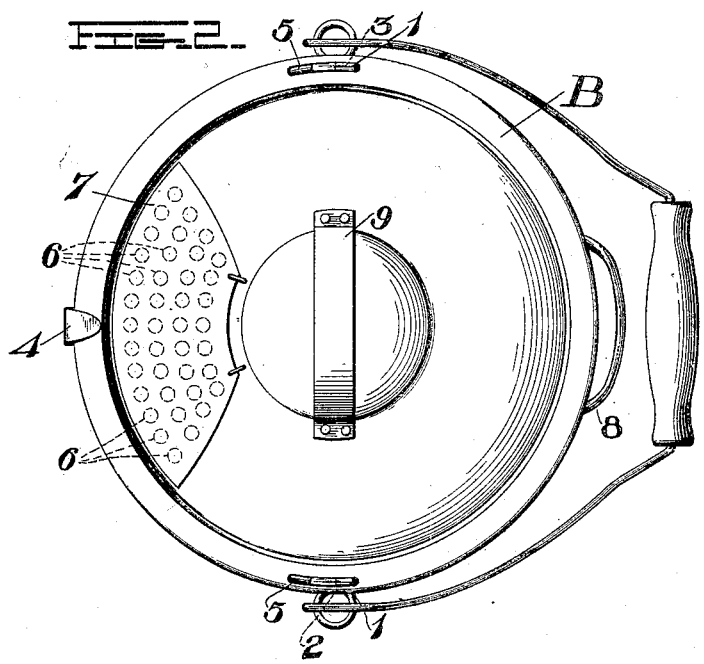
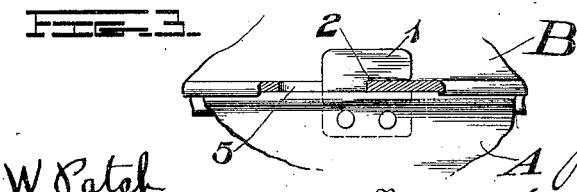
Witnesses
Lloyd W. Patch
A. A. Hammond.
Inventor
Joseph H. Ressler
By Addison G. DuBois
his Attorney

UNITED STATES PATENT OFFICE.

JOSEPH H. RESSLER, OF PITTSFIELD, MASSACHUSETTS.

CULINARY VESSEL.

No. 921,888.  Specification of Letters Patent.  Patented May 18, 1909.

Application filed October 18, 1907. Serial No. 398,102.

*To all whom it may concern:*

Be it known that I, JOSEPH H. RESSLER, a citizen of the United States, residing at Pittsfield, in the county of Berkshire and State of Massachusetts, have invented certain new and useful Improvements in Culinary Vessels, of which the following is a specification.

My invention relates to an improvement in culinary vessels, and the object is to provide a pot or vessel, having a cover which is so connected therewith that hot water or other liquid can be drained from the vessel without burning the hands or body from the steam or liquid.

The invention relates to certain novel features of construction and combinations of parts which will be hereinafter described and pointed out in the claim.

In the accompanying drawing:—Figure 1 is a view in side elevation. Fig. 2 is a top plan view. Fig. 3 is a detail.

A, represents the pot or vessel, and 1, 1, are clips secured to the upper sides of the vessel. One of the clips has a slot 2 therein which is made so that the opening of the slot is toward the rear of the vessel, and the other clip has a similar slot 3 which opening is also toward the rear of the vessel. On the front of the pot is secured a hook 4.

The cover B is provided with two slotted openings 5, 5, through the outer edge, which are adapted to fit over the clips 1, and on the front of the cover perforations 6, 6, are formed for draining off the water from the vegetables and the like, and over these perforations a hinged lid 7 is placed, which is adapted to permit the surplus steam to escape and when the pot is tipped by grasping the handle 8 on the vessel to permit the drainage of the vessel, the lid will fall away from the perforations and permit the water to flow therethrough without the removal of the cover. A handle 9 is placed on the cover for removing it from the vessel.

In placing the cover on the vessel it is inserted beneath the hook 4 and the clips 1 on the vessel enter the slotted openings 5 in the cover, and the cover is given a slight push to enter the slots 2 and 3 of the clips, which hold it in place, so that the cover cannot come off when it is tilted and the liquid is being drained from the vegetables. Of course, to remove the cover it is withdrawn from the slotted openings and by lifting the cover over the top of the clips it can be withdrawn from beneath the hook.

It is evident that many slight changes might be made in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

A culinary vessel having clips on each side edge thereof, and a hook on the front edge, said side clips having slots therein extending toward the rear of the vessel, a cover provided with perforations adapted to be covered by a hinged lid, elongated slots in the cover adapted to pass over the clips, the front end of the cover adapted to fit beneath the hook on the front edge of the vessel, and the side clips adapted to overlie the ends of the elongated slots whereby the cover is held in position.

In testimony whereof I have signed my name to this specification in the presence of two subscribing witnesses.

JOSEPH H. RESSLER.

Witnesses:
 JOHN T. COYNE,
 ANNA F. COLE.